United States Patent
Sahara et al.

(10) Patent No.: US 12,351,162 B2
(45) Date of Patent: Jul. 8, 2025

(54) ON-BOARD ELECTRONIC CONTROLLER AND ON-BOARD DEVICE CONTROL METHOD

(71) Applicant: Hitachi Astemo, Ltd., Hitachinaka (JP)

(72) Inventors: Ryusuke Sahara, Hitachinaka (JP); Yoshitaka Tokunaga, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 302 days.

(21) Appl. No.: 18/014,350

(22) PCT Filed: Jun. 17, 2021

(86) PCT No.: PCT/JP2021/023004
§ 371 (c)(1),
(2) Date: Jan. 4, 2023

(87) PCT Pub. No.: WO2022/034740
PCT Pub. Date: Feb. 17, 2022

(65) Prior Publication Data
US 2023/0256960 A1 Aug. 17, 2023

(30) Foreign Application Priority Data
Aug. 11, 2020 (JP) .................................. 2020-135718

(51) Int. Cl.
*B60W 30/00* (2006.01)
*B60W 30/085* (2012.01)

(52) U.S. Cl.
CPC ....... *B60W 30/085* (2013.01); *B60W 2510/24* (2013.01)

(58) Field of Classification Search
CPC ............ B60W 30/085; B60W 2510/24; H01H 47/002
See application file for complete search history.

(56) References Cited

U.S. PATENT DOCUMENTS 6,822,557 B1 * 11/2004 Weber ................ B60R 16/0232
700/211
7,471,012 B2 12/2008 Kojima
(Continued)

FOREIGN PATENT DOCUMENTS

CN 202657026 U * 1/2013
CN 116800091 A * 9/2023
(Continued)

OTHER PUBLICATIONS

International Search Report (PCT/ISA/210) issued in PCT Application No. PCT/2021/023004 dated Aug. 31, 2021 with English Translation (four (4) pages).
(Continued)

*Primary Examiner* — Peter D Nolan
*Assistant Examiner* — Peter Y Ning
(74) *Attorney, Agent, or Firm* — Crowell & Moring LLP

(57) ABSTRACT

To apply an on-board electronic controller having a relay control driver circuit for performing ON/OFF control of a relay that connects and shuts off a wire from a battery. The on-board electronic controller includes: a switch circuit that is connected to an output unit of the relay control driver circuit to draw out a current; and a control circuit that activates the switch circuit when an abnormality occurs in the vehicle, to cause the switch circuit to draw out the current from the output unit so as not to turn on the relay. This prevents sticking of the relay to ON even in a case where an output harness of a relay control driver is short-circuited to another signal harness or a power supply and GND line.

13 Claims, 6 Drawing Sheets

(56) References Cited

U.S. PATENT DOCUMENTS

| | | | |
|---|---|---|---|
| 9,321,413 B2 | 4/2016 | Maemoto et al. | |
| 2002/0177931 A1* | 11/2002 | Iwasaki | E05B 81/86 |
| | | | 701/33.4 |
| 2006/0076833 A1* | 4/2006 | Kojima | B60L 3/0007 |
| | | | 307/10.1 |
| 2009/0249876 A1* | 10/2009 | Uemura | G01C 19/56 |
| | | | 73/504.12 |
| 2010/0019892 A1* | 1/2010 | Roh | B60R 21/0134 |
| | | | 340/439 |
| 2013/0307328 A1* | 11/2013 | Maemoto | H01M 50/204 |
| | | | 307/10.1 |
| 2015/0279127 A1* | 10/2015 | Dato | G07C 5/085 |
| | | | 701/32.2 |
| 2017/0176509 A1* | 6/2017 | Schulz | G01R 31/006 |
| 2019/0181850 A1* | 6/2019 | Sawano | H03K 17/08122 |

FOREIGN PATENT DOCUMENTS

| | | | | | |
|---|---|---|---|---|---|
| EP | 1391362 | A1 | * | 2/2004 | ......... B60R 16/0239 |
| JP | 10313533 | A | * | 11/1998 | |
| JP | 2004144000 | A | * | 5/2004 | ............ F02N 11/101 |
| JP | 2006103629 | A | * | 4/2006 | ............ B60L 3/0007 |
| JP | 2006143141 | A | * | 6/2006 | ............ B60L 11/123 |
| JP | 2006246623 | A | * | 9/2006 | ............ B60L 11/123 |
| JP | 2009254119 | A | * | 10/2009 | |
| JP | 4650029 | B2 | * | 3/2011 | ............ B60L 11/123 |
| JP | 2013206643 | A | * | 10/2013 | ........... G01R 31/327 |
| JP | 2013-241055 | A | | 12/2013 | |
| JP | 2015133298 | A | * | 7/2015 | |
| JP | 2017178086 | A | * | 10/2017 | |
| KR | 20130068993 | A | * | 6/2013 | ............ B60L 11/123 |
| KR | 20200053197 | A | * | 5/2020 | |
| KR | 20220104407 | A | * | 7/2022 | |
| WO | WO-8701663 | A1 | * | 3/1987 | |

OTHER PUBLICATIONS

Japanese-language Written Opinion (PCT/ISA/237) issued in PCT Application No. PCT/2021/023004 dated Aug. 31, 2021 with English Translation (four (4) pages).

* cited by examiner

ON-BOARD ELECTRONIC CONTROLLER AND ON-BOARD DEVICE CONTROL METHOD

TECHNICAL FIELD

The present invention relates to an on-board electronic controller and an on-board device control method.

BACKGROUND ART

In recent years, electrification of vehicles has been promoted, and, particularly, the number of hybrid electric vehicles (HEVs) equipped with both an engine and a motor is expected to be increasing. An engine ECU (an engine control module (ECM)) that controls the engine and an HEV controller (HEVC) that cooperatively controls driving of the motor and control of the engine are equipped in the HEV; however, to reduce cost, integration of the ECM and the HEVC has been considered. In the following description, an integration of the ECM and the HEVC is referred to as an integrated control unit.

Important roles of the HEVC include, for one, a function of controlling a connection relay (a high-power relay) of high-voltage wiring between a high-voltage battery and an inverter. This function allows it to perform control of shutting off the high-power relay when malfunction or failure occurs in various functions. In particular, in a case where, when a collision occurs, the high-voltage battery wiring is damaged and comes in contact with the vehicle body, it is required to be able to certainly shut off the high-power relay to prevent an occupant in the vehicle from getting an electric shock.

Conventionally, it is general to set the ECM in an engine room, the HEVC in the vehicle interior, and the high-voltage battery in the lower part of the vehicle (for example, underneath the front seat). Thus, the HEVC and a path for the HEVC to control the high-voltage battery are away from the vehicle front having a high risk of damage at the time of a collision, and therefore do not have to take account of risk of damage to a harness.

Meanwhile, as for an integrated control unit that is an integration of the ECM and the HEVC, control of the engine is also included in its important roles; therefore, in terms of a system configuration, it is desirable to install the integrated control unit in the engine room. In this case, at the time of a collision of the vehicle, there is a possibility that a harness part for the ECU to control the high-power relay may be damaged, and, for example, in a case where a short circuit in a power supply occurs, there is concern that the conventional configuration cannot shut off the high-power relay even after the output of a relay driver stops.

To cope with a similar problem that at the time of damage to a vehicle, damage to a control harness of a main relay causes the main relay to stick to ON, PTL 1 describes a technique to prevent sticking of the relay to ON by placing the control harness and a power feed harness of the main relay close together outside of the vehicle interior and thereby causing both their wires to be inevitably damaged at the same time.

CITATION LIST

Patent Literature

PTL 1: JP 2013-241055 A

SUMMARY OF INVENTION

Technical Problem

The technique described in PTL 1 is a technique to prevent sticking of a relay to ON by causing a plurality of wires to be damaged at the same time when damage to a harness is caused by a collision; however, there are various cases of degrees when they are damaged, and it cannot be said that there is no possibility at all that only some of the plurality of wires are damaged. Furthermore, in a case where it is assumed that an integrated control unit itself is set in an engine room, particularly near a connector, there are not only a high-power relay control harness but also various harnesses for signals, a power supply, and GND; therefore, there is a possibility that these and the high-power relay control harness may be short-circuited at the time of a collision.

Moreover, to place the control harness and the power feed harness of the main relay close together outside of the vehicle interior, it is necessary to consider the placement position including the layout of the vehicle.

As described above, at the time of an abnormal event such as a collision of the vehicle, it is desired that sticking of a relay to ON does not happen also in a case where an output harness of a relay control driver is short-circuited to another signal harness or a power supply and GND line.

Solution to Problems

To solve the above problems, for example, a configuration described in claims is adopted.

The present application contains a plurality of means to solve the above problems, and an example thereof includes an on-board electronic controller having a relay control driver circuit for performing ON/OFF control of a relay that connects and shuts off a wire from a battery equipped in a vehicle, the on-board electronic controller including: a switch circuit that is connected to an output unit of the relay control driver circuit to draw out a current; and a control circuit that activates the switch circuit when an abnormality occurs in the vehicle, to cause the switch circuit to draw out the current from the output unit so as not to turn on the relay.

Advantageous Effects of Invention

According to the present invention, when an abnormality occurs in a vehicle, even on the occurrence of a failure that a harness to which an output of the relay control driver circuit is transmitted is short-circuited to another signal harness or a power supply line, or the like, it is possible to maintain a state in which the relay is not turned on. Therefore, when an abnormality occurs in the vehicle, it is possible to certainly shut off the passage of current from the battery equipped in the vehicle.

The problems, configurations, and advantageous effects described above will be revealed in the following description of embodiments.

DESCRIPTION OF EMBODIMENTS

First Embodiment

A first embodiment of the present invention is described below with reference to FIGS. 1 to 4.

Figure 1:
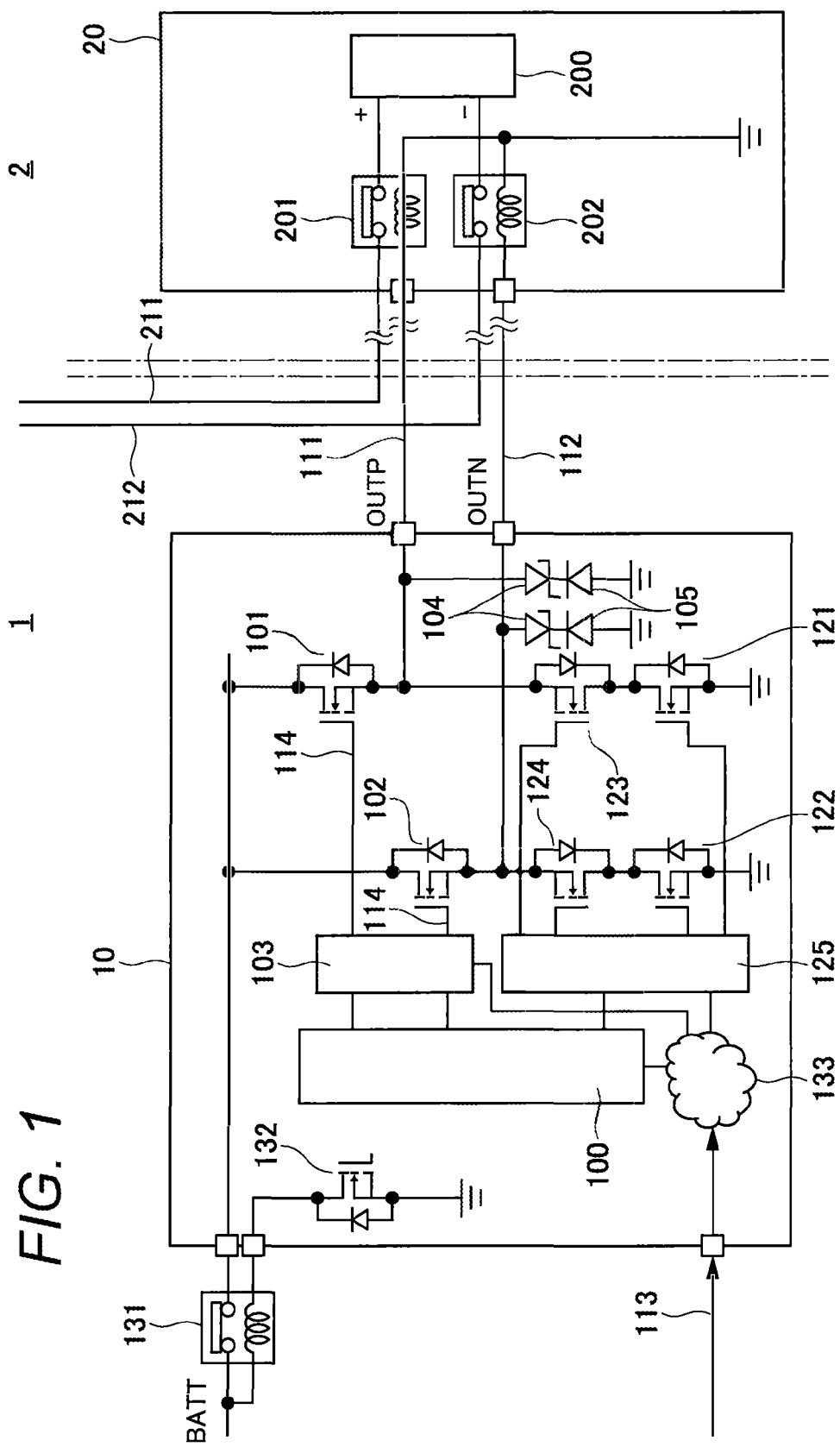
FIG. 1 is a configuration diagram showing an example of an on-board electronic controller according to a first embodiment of the present invention.

FIG. 1 shows a configuration of an on-board electronic controller 10 according to the present embodiment and a high-voltage battery pack 20 controlled by the on-board electronic controller 10.

The on-board electronic controller 10 and the high-voltage battery pack 20 are equipped in a vehicle. The vehicle here is, for example, an HEV equipped with both an engine and a motor as drive sources for traveling. In the present embodiment, the on-board electronic controller 10 is installed in an engine room 1 of the vehicle, and the high-voltage battery pack 20 is installed in a vehicle interior 2 of the vehicle. The on-board electronic controller 10 and the high-voltage battery pack 20 are connected by control signal harnesses 111 and 112.

The high-voltage battery pack 20 has an output voltage of, for example, 100 V or higher, and a cathode (+) and an anode (−) of a battery cell 200 in the high-voltage battery pack 20 are connected to a high-voltage line (+) 211 and a high-voltage line (−) 212 through high-power relays 201 and 202, respectively. The high-power relays 201 and 202 are switches that make connection and disconnection between the battery cell 200 and the high-voltage lines 211 and 212, and the connection and disconnection is controlled by the on-board electronic controller 10.

The high-voltage line (+) 211 and the high-voltage line (−) 212 are connected to a DC-DC converter, the motor for traveling, and a generator for power generation which are not shown in the drawing. It is noted that the high-voltage battery pack 20 generally has a configuration including a pre-charge line for pre-charging the high-voltage line (+) 211 and a connection relay; however, here these are omitted from the drawing for simplicity of description.

The on-board electronic controller 10 includes a microcomputer (hereinafter referred to as a microcomputer) 100, control output drivers 101 and 102, and a control circuit 103.

The control output drivers 101 and 102 are N-channel field effect transistors that control the high-power relays 201 and 202, respectively. The respective drains of the control output drivers 101 and 102 are supplied with +-side power from a 12-V battery (not shown) through a relay 131. This relay 131 is for fail-safe, and connection and disconnection made thereby is controlled by the output of a driver 132 in the on-board electronic controller 10.

The respective sources of the control output drivers 101 and 102 are connected to one ends of the control signal harnesses 111 and 112 through driver output terminals OUTP and OUTN, respectively. The other ends of the control signal harnesses 111 and 112 are connected to control terminals of the high-power relays 201 and 202, respectively. These connections allow the connection and disconnection made by the high-power relays 201 and 202 to be controlled by the output of the control output drivers 101 and 102.

The control circuit 103 is a circuit that controls the high-power relays 201 and 202, and controls the voltage of a gate signal 114 and so forth on the basis of an instruction from the microcomputer 100. Gate signals 114 output from the control circuit 103 are provided to the gates of the control output drivers 101 and 102.

One ends of Zener diodes 104 are connected to between the respective sources of the control output drivers 101 and 102 and the driver output terminals OUTP and OUTN. The other ends of the Zener diodes 104 are connected to a ground potential part through diodes 105.

The Zener diodes 104 and the diodes 105 are connected to the driver output terminals OUTP and OUTN in this way, which makes it possible to appropriately protect the control output drivers 101 and 102. That is, after the control output drivers 101 and 102 are turned off, the Zener diodes 104 and the diodes 105 can protect the drain-source of the control output drivers 101 and 102 from breakdown caused by counter-electromotive voltage due to inductance of the high-power relays 201 and 202.

It is noted that instead of the Zener diodes 104 and the diodes 105, a switching element such as a field effect transistor having an active clamp function can be used.

An external signal 113 as a vehicle abnormality detection signal is provided to the on-board electronic controller 10. Here, the external signal 113 is a signal to notify that a collision has occurred in the vehicle; for example, from a controller (not shown) of an air-bag installed in the vehicle, the external signal 113 is provided to the on-board electronic controller 10. In the following description, the external signal 113 is referred to as a collision notification signal 113.

This collision notification signal 113 is provided to the microcomputer 100 and the control circuit 103 through a logic circuit 133. Furthermore, the collision notification signal 113 is also provided to a later-described control circuit 125 through the logic circuit 133.

In a case where an abnormality has been detected from the collision notification signal 113, the microcomputer 100 controls the driver 132 and disconnects the relay 131 for fail-safe, thereby performing a process of cutting power supply to the control output drivers 101 and 102. Thus, in a case where an abnormality has occurred, a process of putting the high-power relays 201 and 202 into a disconnected state is performed.

It is noted that the relay 131 for fail-safe may be omitted. In this case, when having detected an abnormality from the collision notification signal 113, the microcomputer 100 directly controls the control output drivers 101 and 102 through the control circuit 103 to put the high-power relays 201 and 202 into a disconnected state.

Furthermore, in the on-board electronic controller 10 of the present embodiment, a series circuit of a backflow prevention circuit 123 and a switch circuit 121 is connected to the source of the control output driver 101, and a series circuit of a backflow prevention circuit 124 and a switch circuit 122 is connected to the source of the control output driver 102. The backflow prevention circuits 123 and 124 and the switch circuits 121 and 122 each include an N-channel field effect transistor.

That is, the source of the control output driver 101 is connected to the source of the field effect transistor as the backflow prevention circuit 123, and the drain of the field effect transistor as the backflow prevention circuit 123 is connected to the drain of the field effect transistor as the switch circuit 121. Furthermore, the source of the field effect transistor as the switch circuit 121 is connected to a ground potential part.

Likewise, the source of the control output driver 102 is connected to the source of the field effect transistor as the backflow prevention circuit 124, and the drain of the field effect transistor as the backflow prevention circuit 124 is connected to the drain of the field effect transistor as the switch circuit 122. The source of the field effect transistor as the switch circuit 122 is connected to a ground potential part.

The backflow prevention circuits 123 and 124 and the switch circuits 121 and 122 are controlled by a gate signal from the control circuit 125. When having detected an abnormality from a collision notification signal 113, the control circuit 125 outputs a gate signal to activate the backflow prevention circuits 123 and 124 and the switch circuits 121 and 122. Or, the control circuit 125 activates the backflow prevention circuits 123 and 124 and the switch circuits 121 and 122 in accordance with an instruction from the microcomputer 100.

The timing at which the control circuit 125 activates the backflow prevention circuits 123 and 124 and the switch circuits 121 and 122 when the microcomputer 100 has received a collision notification signal 113 is set to a little after the timing at which the control circuit 103 turns off the control output drivers 101 and 102 upon receiving the collision notification signal 113. That is, it is necessary to provide a little time lag between the timing to activate the backflow prevention circuits 123 and 124 and the switch circuits 121 and 122 and the timing to turn off the control output drivers 101 and 102.

It is noted that here is provided an example in which an N-channel field effect transistor is used as the backflow prevention circuits 123 and 124; however, a diode element may be used instead of the N-channel field effect transistor. In this regard, however, a large current is assumed to be applied to the backflow prevention circuits 123 and 124 of the present embodiment; therefore, it is more preferable to use a field effect transistor to suppress heat generation.

Figure 2:
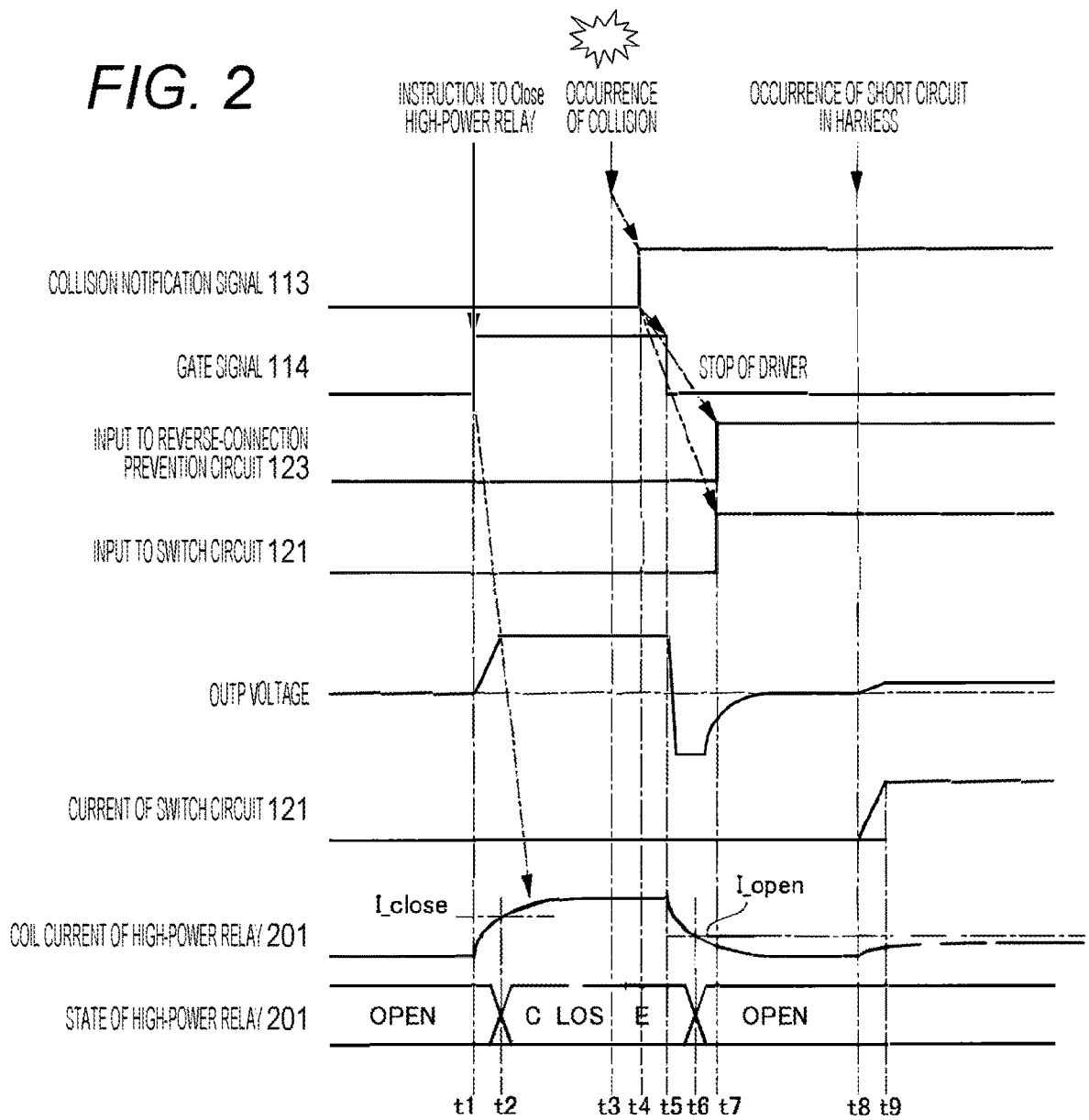
FIG. 2 is a timing chart showing an operation example according to the first embodiment of the present invention.

FIG. 2 is a timing chart showing an example of control of the high-power relay 201 by the on-board electronic controller 10. In FIG. 2, the control state of one of the high-power relay 201 is illustrated; as for the other high-power relay 202, it can be similarly described as the same control state.

A collision notification signal 113 shown in the first row in FIG. 2 is at low level in normal time, and becomes at high level after the timing at which a collision has been detected.

Agate signal 114 shown in the second row in FIG. 2 is a gate signal 114 to the control output driver 101 that the control circuit 103 outputs. The on-board electronic controller 10 starts operating, and, at time t1, the gate signal 114 changes from low level to high level, and the control output driver 101 falls into an ON state. In this way, the control output driver 101 falls into the ON state, thereby the output voltage of the driver output terminal OUTP rises up, and a coil current of the high-power relay 201 starts to flow.

Furthermore, the coil current of the high-power relay 201 shown in the seventh row in FIG. 2 starts to flow at time t1, and exceeds a relay-ON threshold current I_close at time t2. Therefore, as shown in the eighth row in FIG. 2, the state of the high-power relay 201 changes from a disconnected state to a connected state at time t2.

In this way, the high-power relay 201 (and the high-power relay 202) falls into the connected state, thereby the high-voltage battery pack 20 is connected to the DC-DC converter and so forth, and the motor is driven with power from the high-voltage battery pack 20. Furthermore, the high-voltage battery pack 20 is charged with electricity generated by the generator.

It is noted that, at normal time, agate signal to the backflow prevention circuit 123 and a gate signal to the switch circuit 121 are both at low level, and the backflow prevention circuit 123 and the switch circuit 121 are in an OFF state.

Here, in the example of FIG. 2, at time t3, a collision of the vehicle occurs; immediately after that, at time t4, the collision notification signal 113 shown in the first row in FIG. 2 changes to high level. FIG. 2 shows a state in which the occurrence of the collision is notified at time t4.

At this time, the control circuit 103 changes the gate signal 114 shown in the second row in FIG. 2 to low level at time t5. This puts the control output driver 101 into the OFF state, and the current from the control output driver 101 is shut off. Then, OUTP voltage in the sixth row in FIG. 2 is decreased because of counter-electromotive force due to the inductance of the high-power relay 201.

The OUTP voltage is clamped by the Zener diode 104 and the diode 105, and converges to a ground potential (GND) with decrease in the coil current, while the drain-source voltage of the control output driver 101 is protected.

While such control is being performed, at time t6 at which the coil current of the high-power relay 201 shown in the seventh row in FIG. 2 drops below a relay-OFF threshold current I_open, the state of the high-power relay 201 changes from the connected state (CLOSE) to the disconnected state (OPEN).

In this way, the high-power relay 201 falls into the disconnected state, thereby the output of high voltage from the high-voltage battery pack 20 is shut off.

Incidentally, at this time, if there is no backflow prevention circuit 123, even when the switch circuit 121 is off, before the OUTP voltage is decreased to a voltage to be clamped by the Zener diode 104 and the diode 105 because of the counter-electromotive force, a current flows into the high-power relay 201 from the ground potential (GND) through a body diode of the switch circuit 121. Thus, the OUTP voltage decreases only to a voltage of about a forward voltage of the body diode, and the coil current decreases for a longer time, therefore, it takes longer for the high-power relay 201 to reach the relay-OFF threshold current I_open. Furthermore, this also involves risks of heat generated by the current continuously flowing into the body diode and destruction of an element. Therefore, it is preferable to connect the backflow prevention circuits 123 and 124 to the switch circuits 121 and 122, respectively.

Moreover, in the present embodiment, at time t7, a certain period of time after the collision notification signal 113 has changed to high level, the control circuit 125 turns on the switch circuit 121 and the backflow prevention circuit 123. Here, if the time lag between time t5 at which the control output driver 101 is turned off and time t7 at which the switch circuit 121 and the backflow prevention circuit 123 are turned on is too short, there is a possibility that the control output driver 101 and the switch circuit 121 are turned on at the same time. There is a possibility that a flow-through current from the power supply to the ground potential (GND) is generated, therefore, it is necessary to set the time lag between time t5 and time t7 so as not to generate a flow-through current.

The switch circuit 121 and the backflow prevention circuit 123 are turned on, thereby the current due to the inductance of the high-power relay 201 flows through not the Zener diode 104 and the diode 105 but the switch circuit 121 and the backflow prevention circuit 123.

It is noted that, in a case where current energy due to the inductance is wanted to be consumed quickly by clamping operation by the Zener diode 104 and the diode 105, it requires a timing design that turns on the switch circuit 121 and the backflow prevention circuit 123 after the clamping operation by a clamping diode is fully performed.

In the example of FIG. 2, subsequently, at time t8, the control signal harness 111 and a wire of a harness of a power supply system are brought into contact by an impact caused by the collision, and a short circuit occurs.

On the occurrence of such a short circuit, in the conventional configuration in which the switch circuit 121 and the backflow prevention circuit 123 are not provided, a current flows from a short-circuited point to a coil of the high-power relay 201.

On the other hand, in the case of the on-board electronic controller 10 of the present embodiment, the switch circuit 121 is turned on, thereby the current from the short-circuited point flows as the current of the switch circuit 121. Therefore, as shown in FIG. 2, the OUTP voltage does not rise, and the current flowing to the coil of the high-power relay 201 is reduced, which makes it possible to prevent the high-power relay 201 from being turned on. Thus, even if a short circuit of the harness occurs at the time of a collision, the high-voltage battery pack 20 and the high-voltage lines 211 and 212 are certainly in a disconnected state.

Figure 3:
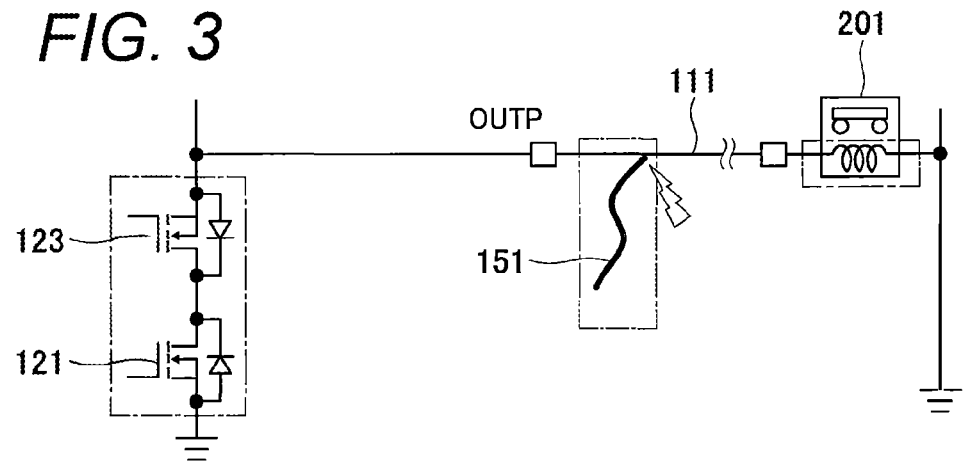
FIG. 3 is a configuration diagram showing a path leading to a control signal harness according to the first embodiment of the present invention.
Figure 4:
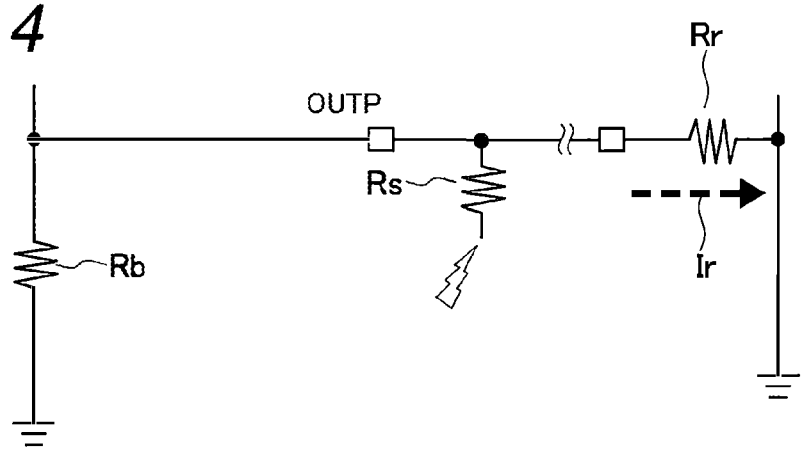
FIG. 4 is an equivalent circuit diagram of the configuration diagram of FIG. 3.

FIG. 3 is a circuit diagram of an extract part of a path leading to the control signal harness 111 shown in FIG. 1. The occurrence of the short circuit in the harness shown at time t8 in FIG. 2 means an abnormal state in which a power supply system harness 151 of which the exterior has been damaged comes into contact with the harness 111 in the path shown in FIG. 3. FIG. 4 is a diagram of an equivalent circuit converted from a circuit configuration shown in FIG. 3.

The state in which the field effect transistors included in the switch circuit 121 and the backflow prevention circuit 123 of FIG. 3 are turned on can be considered as a resistor Rb shown in FIG. 4 with ON-resistance components synthesized in terms of direct current. The coil of the high-power relay 201 in FIG. 3 is in a state in which the current is constant in terms of direct current, and can be considered as a resistor Rr in FIG. 4. Furthermore, as for a short-circuited point of the power supply system harness 151, on the assumption of a contact resistance, a load going through the power supply, and so forth, a resistor Rs is set in FIG. 4.

In the equivalent circuit shown in FIG. 4, it is assumed that a battery power supply is connected to the upstream of the resistor Rs. The characteristics of each element are selected so that a current Ir flowing to the resistor Rr becomes equal to or less than I_open shown in FIG. 2, which makes it possible to prevent the high-power relay 201 from being turned on.

The resistor Rr depends on the specifications of the high-power relay 201; however, as for the resistor Rs, it is necessary to assume a contact resistance and a resistance component of a harness likely to be short-circuited.

When this resistor Rs is set, the field effect transistors included in the switch circuit 121 and the backflow prevention circuit 123 are selected so that the current Ir becomes lower than the threshold current I_open. That is, it is necessary to select a resistance value of the resistor Rb shown in the equivalent circuit of FIG. 4.

It is noted that, in a case where the value of the resistor Rs of the equivalent circuit shown in FIG. 4 is set to low, it is necessary to reduce the value of the resistor Rb accordingly; however, as for this resistor Rb, there are limitations including size, loss, and so forth. In this case, a fuse is connected to a battery located on the upstream of a power supply harness, and is designed to be disconnected if a large current flows to the fuse, which makes it possible to prevent sticking of the high-power relay to ON.

Second Embodiment

Figure 5:
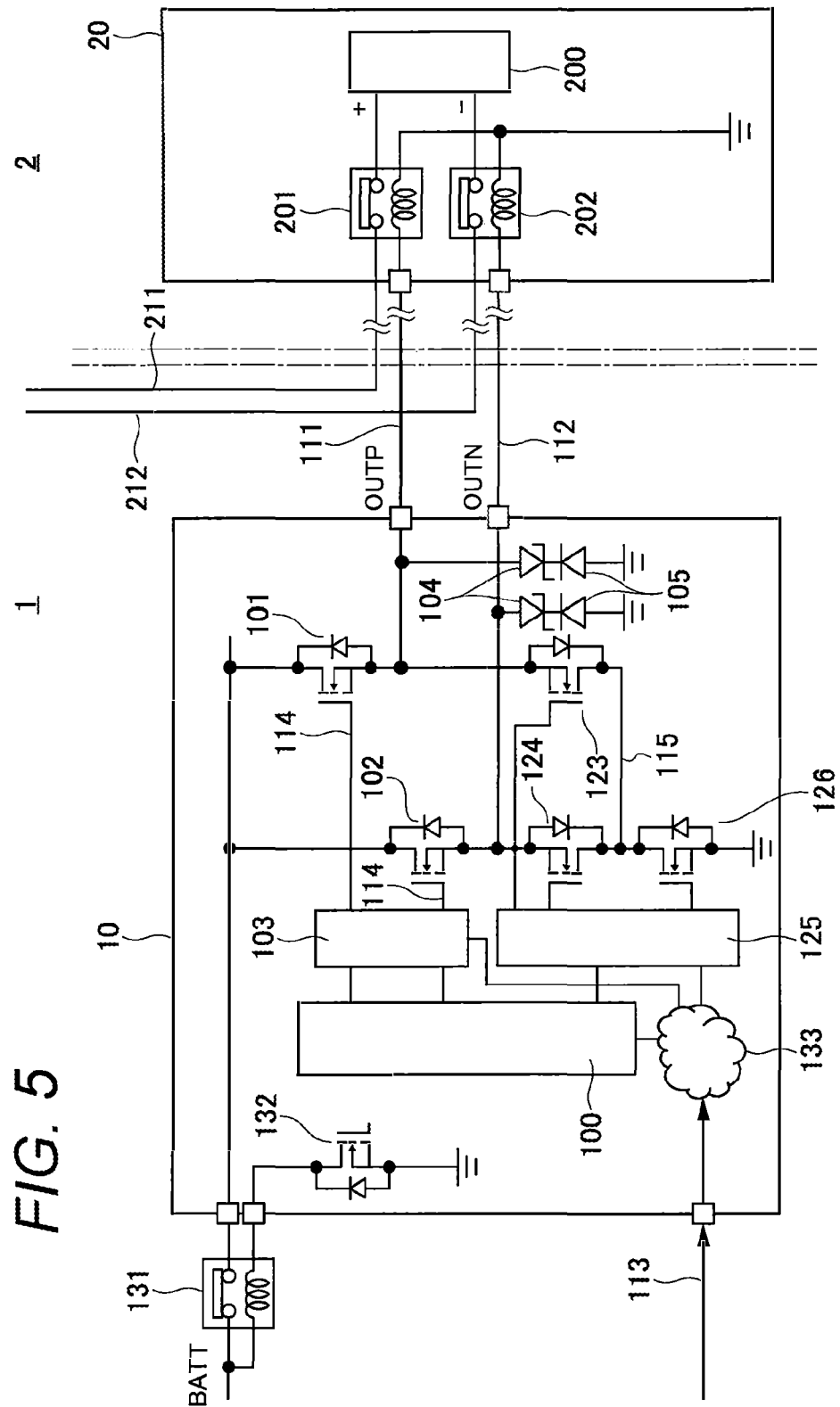
FIG. 5 is a configuration diagram showing an example of an on-board electronic controller according to a second embodiment of the present invention.

Subsequently, a second embodiment of the present invention is described with reference to FIG. 5. In FIG. 5, parts corresponding to those in FIGS. 1 to 4 described in the first embodiment are assigned the same reference numerals, and repetition of their description is omitted.

FIG. 5 shows a configuration of the on-board electronic controller 10 according to the present embodiment.

The on-board electronic controller 10 shown in FIG. 5 is the same as the on-board electronic controller 10 shown in FIG. 1 in that it includes the control output drivers 101 and 102, and the connection and disconnection of the high-power relays 201 and 202 is controlled by the respective outputs of the control output drivers 101 and 102.

The on-board electronic controller 10 shown in FIG. 5 is different in that instead of the two switch circuits 121 and 122 shown in FIG. 1, one switch circuit 126 is used in common.

That is, in the on-board electronic controller 10 shown in FIG. 5, one switch circuit 126 is connected to the respective sources of the control output drivers 101 and 102 through the backflow prevention circuits 123 and 124.

As this switch circuit 126, an N-channel field effect transistor is used as shown in FIG. 5. Specifically, the drain of the field effect transistor included in the switch circuit 126 is connected in common to the drains of two field effect transistors included in the backflow prevention circuits 123 and 124. The source of the field effect transistor included in the switch circuit 126 is connected to a ground potential part.

It is noted that in FIG. 5, a signal obtained at a connection point between the backflow prevention circuits 123 and 124 and the switch circuit 126 is referred to as an internal signal 115.

The gate of the field effect transistor that is the switch circuit 126 is provided with a gate signal from the control circuit 125, and on/off of the switch circuit 126 is controlled by the control circuit 125.

The rest of the configuration of the on-board electronic controller 10 shown in FIG. 5 is configured to be similar to that of the on-board electronic controller 10 shown in FIG. 1. Furthermore, the timing at which the control circuit 125 controls the switch circuit 126 is also the same as the timing at which the control circuit 125 of the on-board electronic controller 10 shown in FIG. 1 controls the switch circuits 121 and 122.

The operation of the on-board electronic controller 10 having the configuration shown in FIG. 5 is described below.

In a state in which the respective backflow prevention circuits 123 and 124 are turned off, for example, when the control output driver 102 is in the OFF state, and the control output driver 101 is in the ON state, the driver output terminal OUTP increases to a battery power supply voltage. This driver output terminal OUTP increases to the power supply voltage, thereby the internal signal 115 increases to near the battery voltage through the body diode of the element as the backflow prevention circuit 123. However, there is the backflow prevention circuit 124, thus this voltage is not transmitted to the OUTN output.

When the control output driver 101 has changed from ON to OFF, as described in FIG. 2, the OUTP voltage becomes negative because of the counter-electromotive force due to the inductance of the high-power relay 201. At this time, the backflow prevention circuit 123 is turned off, thereby the negative voltage of the OUTP output is not transmitted to the internal signal 115, therefore there is no influence on the OUTN output side.

Furthermore, in a case where the OUTP output and the OUTN output are simultaneously turned on, a higher voltage of either the OUTP output or the OUTN output is transmitted to the internal signal 115 through the respective body diodes of the element as the backflow prevention circuits 123 and 124; however, its influence does not affect the other output.

In this way, even if the switch circuit 126 is shared, the OUTP output and the OUTN output are configured to each include the backflow prevention circuits 123 and 124, which makes it possible to prevent their respective operations from affecting the other at the time of normal operation.

When the common switch circuit 126 is turned on, it is applied on the condition that the control output drivers 101 and 102 are both turned off; however, there is no problem with the operation at the timing described in FIG. 2. That is, a collision notification signal 113 is transmitted to the microcomputer 100, and the control output drivers 101 and 102 are turned off, and after that, an operation of turning on the switch circuit 126 is performed. Then, prevention of sticking of the high-power relays 201 and 202 to ON when the harness is short-circuited works properly.

It is noted that in the configuration shown in FIG. 5, an output unit of the on-board electronic controller 10 includes two outputs of the OUTP output and the OUTN output. In this regard, the on-board electronic controller 10 can add more common output units, such as a pre-charge output.

As described above, the on-board electronic controller 10 of the present embodiment is configured to be provided with the common switch circuit 126, thus it is possible to reduce the manufacturing cost of the controller and reduce the area of elements equipped in the controller, and therefore possible to contribute to reduction in size of the controller.

Third Embodiment

Subsequently, a third embodiment of the present invention is described with reference to FIG. 6. In FIG. 5, parts corresponding to those in FIGS. 1 to 4 described in the first embodiment are assigned the same reference numerals, and repetition of their description is omitted.

Figure 6:
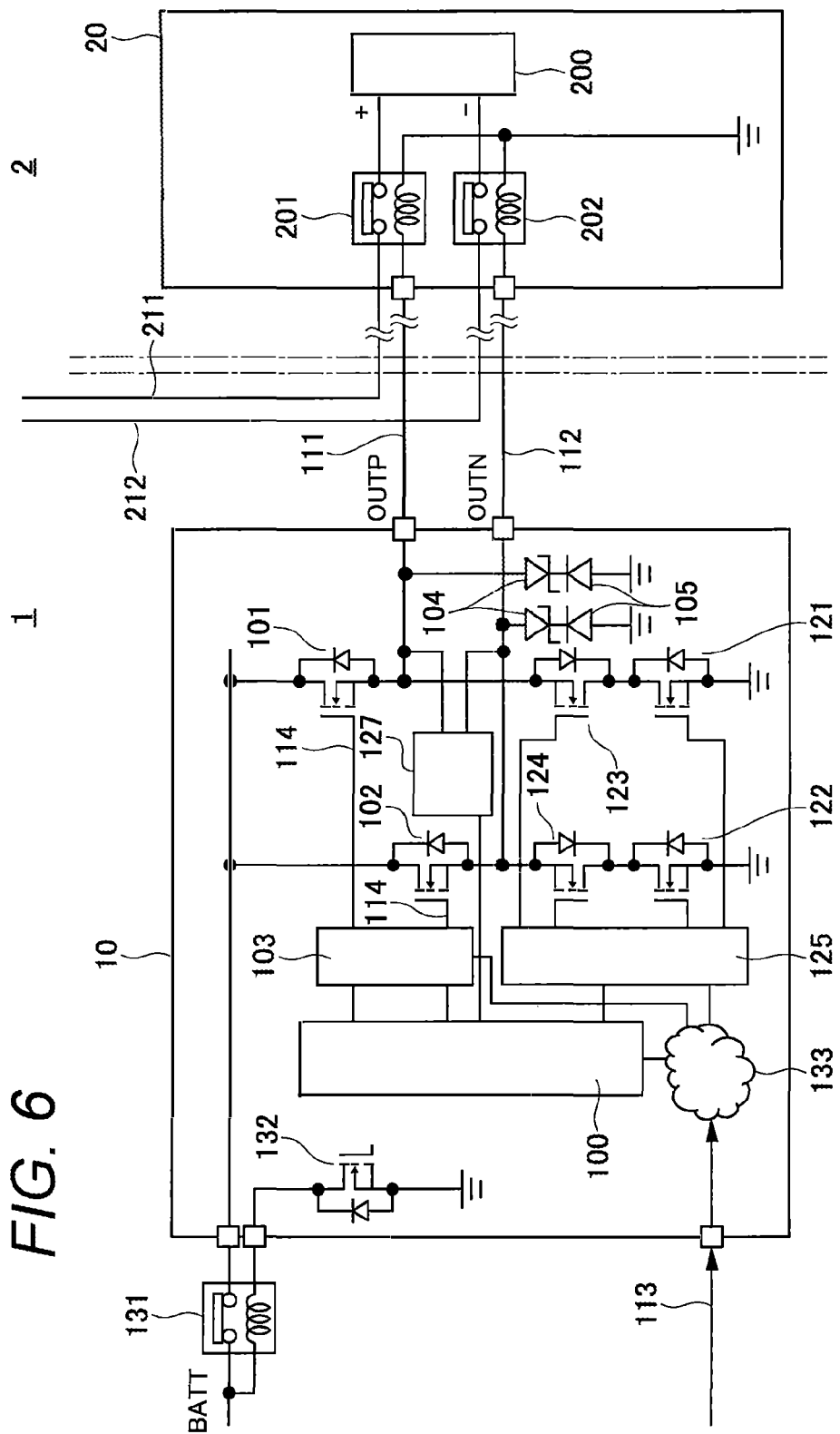
FIG. 6 is a configuration diagram showing an example of an on-board electronic controller according to a third embodiment of the present invention.

FIG. 6 shows a configuration of the on-board electronic controller 10 according to the present embodiment.

The on-board electronic controller 10 shown in FIG. 6 includes the control output drivers 101 and 102, and the connection and disconnection of the high-power relays 201 and 202 is controlled by the respective outputs of the control output drivers 101 and 102.

Furthermore, the on-board electronic controller 10 shown in FIG. 6 includes the switch circuits 121 and 122 and the backflow prevention circuits 123 and 124, and, at the time of an abnormal event, current is applied from the OUTP output and the OUTN output. The foregoing configuration is the same as that of the on-board electronic controller 10 shown in FIG. 1.

The on-board electronic controller 10 shown in FIG. 6 is different from the on-board electronic controller 10 shown in FIG. 1 in that it includes a breaking-of-wire and short-circuit detection circuit 127 as a circuit that detects an abnormality.

This breaking-of-wire and short-circuit detection circuit 127 detects if the states of the OUTP output and the OUTN output are a short circuit to the power supply or a ground fault. When having detected that either the OUTP output or the OUTN output suffers breaking of wire or a short circuit, the breaking-of-wire and short-circuit detection circuit 127 provides a detection signal to the microcomputer 100.

When having received the detection signal from the breaking-of-wire and short-circuit detection circuit 127, the microcomputer 100 turns on the switch circuits 121 and 122 and the backflow prevention circuits 123 and 124.

It is noted that the coils of the high-power relays 201 and 202 are connected to the ground potential parts GND, thus, when the control output drivers 101 and 102 are turned off, it is difficult for the breaking-of-wire and short-circuit detection circuit 127 to make a distinction between the normal state and a ground fault. However, when it is a ground fault, the high-power relays 201 and 202 stick to OFF; thus, its inability to make a distinction between the normal state and a ground fault is not fatal to safety.

Furthermore, in a case where the breaking-of-wire and short-circuit detection circuit 127 has detected breaking of wire, it cannot be dealt with by the outputs of the control output drivers 101 and 102, thus the switch circuits 121 and 122 and the backflow prevention circuits 123 and 124 remain off.

Moreover, in a case where the breaking-of-wire and short-circuit detection circuit 127 has detected a short circuit to the power supply, in a state in which the control output driver 101 or 102 of the output unit (the OUTP output or the OUTN output) that has detected the short circuit to the power supply is turned off, the switch circuit 121 or 122 and the backflow prevention circuit 123 or 124 of the corresponding system are turned from off to on, thereby the current is drawn out, and it is possible to prevent sticking of the high-power relay to ON.

It is noted that, in the configuration shown in FIG. 6 in which the breaking-of-wire and short-circuit detection circuit 127 is provided, the control upon receiving a collision notification signal 113 from the outside described in the first embodiment may further be performed.

Fourth Embodiment

Figure 7:
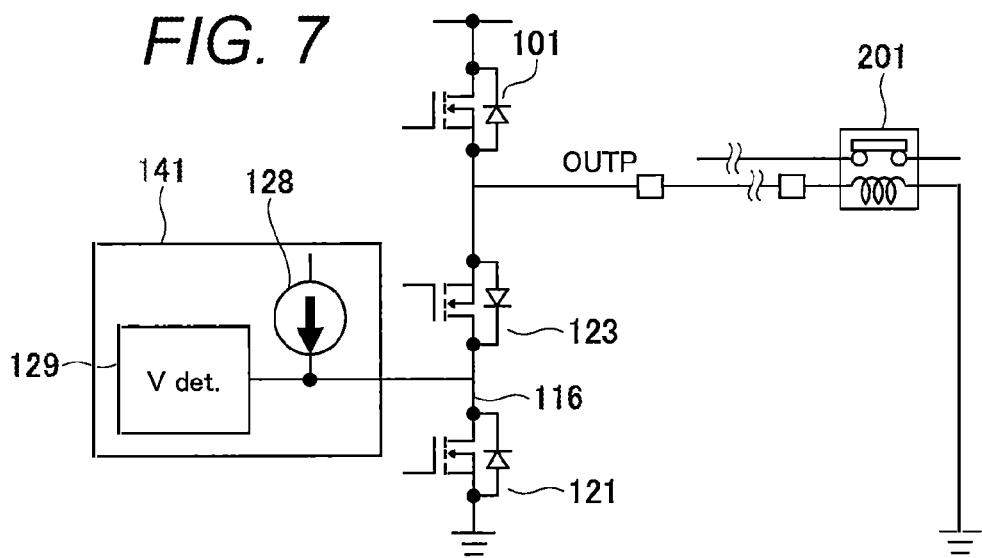
FIG. 7 is a configuration diagram showing an example of an on-board electronic controller according to a fourth embodiment of the present invention.

Subsequently, a fourth embodiment of the present invention is described with reference to FIG. 7. In FIG. 7, parts corresponding to those in FIGS. 1 to 4 described in the first embodiment are assigned the same reference numerals, and repetition of their description is omitted.

FIG. 7 shows a configuration of the on-board electronic controller 10 according to the present embodiment.

FIG. 7 shows only characteristic points in the on-board electronic controller 10 according to the present embodiment, and parts of the on-board electronic controller 10 omitted from the drawing are configured to be similar to those of the on-board electronic controller 10 shown in FIG. 1.

The on-board electronic controller 10 shown in FIG. 7 is provided with a diagnosis circuit 141 of the switch circuits 121 and 122 and the backflow prevention circuits 123 and 124.

The diagnosis circuit 141 includes a diagnostic current source 128 and a voltage monitoring circuit 129. The diagnostic current source 128 and the voltage monitoring circuit 129 are connected to a signal line 116 connecting the backflow prevention circuit 123 and the switch circuit 121.

To explain about the operation of the diagnosis circuit 141, for example, first, the control circuit 103 (FIG. 1) puts both the backflow prevention circuit 123 and the switch circuit 121 into the OFF state to apply a current from the diagnostic current source 128 to the signal line 116.

Here, in a case where the backflow prevention circuit 123 and the switch circuit 121 are both normal, there is no path through which the current flows from the signal line 116, and the voltage value depending on the diagnostic current source 128 is detected by the voltage monitoring circuit 129.

Next, the control circuit 103 puts both the backflow prevention circuit 123 and the switch circuit 121 into the ON state to apply the current from the diagnostic current source 128 to the signal line 116, and the voltage monitoring circuit 129 detects the voltage of the signal line 116. The voltage detected in the ON state changes from the voltage in the OFF state.

Therefore, the diagnosis circuit 141 can confirm that the backflow prevention circuit 123 and the switch circuit 121 operate normally by means of the voltage monitoring circuit 129.

A diagnosis by the diagnosis circuit 141 is made, for example, when the on-board electronic controller 10 is started or while the output is off.

It is noted that the diagnosis circuit 141 shown in FIG. 7 is configured to diagnose the one switch circuit 121 and the one backflow prevention circuit 123; however, with a similar configuration, the diagnosis circuit 141 can diagnose the other switch circuit 122 and the other backflow prevention circuit 124, which are omitted from FIG. 7, as well.

The on-board electronic controller 10 includes the diagnosis circuit 141 in this way, which makes it possible to confirm that the protection operation is certainly performed. That is, while the switch circuits 121 and 122 and the backflow prevention circuits 123 and 124 that the on-board electronic controller 10 includes are circuits that do not have to be activated in normal time, for safety purposes, they are required to be certainly activated when an abnormality occurs. Here, it includes the diagnosis circuit 141, and makes a diagnosis at the time of start-up or while the output is off, and thereby can confirm that the protection function works effectively at the time of an abnormal event.

Modification Example

It is noted that the present invention is not limited to the above-described embodiments, and includes various modification examples. For example, the above-described embodiments are described in detail to explain the present invention in a comprehensible way, and are not necessarily limited to those having all the described configurations.

Furthermore, the respective configurations of the embodiments may be appropriately combined; for example, the configuration of the second embodiment shown in FIG. 5 and the configuration of the third embodiment shown in FIG. 6 may be combined, or the configuration of the second embodiment shown in FIG. 5 and the configuration of the fourth embodiment shown in FIG. 7 may be combined.

Moreover, each circuit diagram shows a system in which the high-power relay with the ground potential part connected thereto is controlled by a high-side driver. On the other hand, the embodiments may be applied to an on-board electronic controller having a configuration opposite to that in FIG. 1 or other drawings, i.e., a circuit configuration of a system in which the high-side high-power relay is driven by a low-side driver.

Furthermore, the point that the on-board electronic controller 10 is installed in the engine room 1, and the high-voltage battery 20 is installed in the vehicle interior as shown in FIG. 1 or other drawings is just an example; alternatively, they may be installed in other positions. Moreover, the high-voltage battery 20 is configured to have an output voltage of 100 V or higher in the above-described embodiment; however, as long as it is a higher voltage than an ordinary on-board battery (12 V or the like), a battery having a different output voltage, for example, of 48 V or the like may be used.

Furthermore, the circuit diagram of FIG. 1 or other drawings shows only the signal lines and the control lines that are thought to be necessary for the description, and does not necessarily show all the control lines and the information lines of the product. In fact, it may be considered that virtually all components are connected to one another.

REFERENCE SIGNS LIST 10 on-board electronic controller
20 high-voltage battery pack
100 microcomputer
101, 102 control output driver
103 control circuit
104 Zener diode
105 diode
111, 112 control signal harness
113 external signal (collision notification signal)
114 gate signal
115 internal signal
116 signal line
121, 122 switch circuit
123, 124 backflow prevention circuit
125 control circuit
126 switch circuit
127 breaking-of-wire and short-circuit detection circuit
128 diagnostic current source
129 voltage monitoring circuit
131 fail-safe relay
132 driver
141 diagnosis circuit
151 power supply system harness
201, 202 high-power relay
211 high-voltage line (+)
212 high-voltage line (−)
OUTP, OUTN output terminal

The invention claimed is:

1. An on-board electronic controller having a relay control driver circuit for performing ON/OFF control of a relay that connects and shuts off a wire from a battery equipped in a vehicle, the on-board electronic controller comprising:
a switch circuit that is connected to an output unit of the relay control driver circuit to draw out a current; and
a control circuit that activates the switch circuit when an abnormality occurs in the vehicle, to cause the switch circuit to draw out the current from the output unit so as not to turn on the relay, wherein the switch circuit is connected to the output unit through a backflow prevention circuit, when the driver circuit is in operation, the backflow prevention circuit prevents a current caused by a counter-electromotive force from flowing to the switch circuit, the relay includes a first relay connected to one of poles of the battery and a second relay connected to another pole of the battery, the output unit includes a first output unit that controls the first relay and a second output unit that controls the second relay, and the switch circuit commonly controls the first output unit and the second output unit through different backflow prevention circuits from each other.

2. The on-board electronic controller according to claim 1, wherein the switch circuit and the backflow prevention circuit each include a field effect transistor, and the field effect transistor included in the switch circuit and the field effect transistor included in the backflow prevention circuit are connected in series.

3. The on-board electronic controller according to claim 1, comprising an input unit to which a collision notification signal of the vehicle is provided, wherein the control circuit activates the switch circuit when the collision notification signal is provided to the input unit, to perform a process of drawing out the current from the output unit.

4. The on-board electronic controller according to claim 3, wherein the collision notification signal is a signal output when an air-bag of the vehicle is activated.

5. The on-board electronic controller according to claim 3, wherein the switch circuit is activated with a predetermined time lag after a timing to turn off the relay control driver circuit.

6. The on-board electronic controller according to claim 1, comprising a short-circuit detection circuit that detects a short circuit of an output terminal of the output unit, wherein the switch circuit and the backflow prevention circuit are activated when the short-circuit detection circuit has detected a short circuit to a power supply or a ground fault of the output terminal.

7. The on-board electronic controller according to claim 6, wherein the short-circuit detection circuit further detects breaking of wire of the output terminal of the output unit, and, when having detected breaking of wire, prevents the switch circuit from being turned on.

8. The on-board electronic controller according to claim 1, comprising a diagnosis circuit that makes a diagnosis of the switch circuit, wherein from the diagnosis made by the diagnosis circuit, the control circuit confirms that the switch circuit is capable of being activated.

9. The on-board electronic controller according to claim 1, comprising a diagnosis circuit that makes a diagnosis of the switch circuit, wherein from the diagnosis made by the diagnosis circuit, the control circuit confirms that the switch circuit is capable of being activated.

10. The on-board electronic controller according to claim 9, wherein the diagnosis circuit makes the diagnosis based on a value of voltage monitored by the voltage monitor when a current from the diagnostic current source is applied to a connection point between the switch circuit and the backflow prevention circuit in a state where the switch circuit and the backflow prevention circuit are turned off and a value of voltage monitored by the voltage monitor when a current from the diagnostic current source is applied to the connection point between the switch circuit and the backflow prevention circuit in a state where the switch circuit and the backflow prevention circuit are turned on.

11. The on-board electronic controller according to claim 9, wherein the diagnosis by the diagnosis circuit is made at a time of start-up of the controller or while output is off.

12. The on-board electronic controller according to claim 1, wherein the vehicle includes at least a motor as a power source for traveling; the battery is a high-voltage battery that supplies electric power to the motor; and the relay is a high-power relay that connects and shuts off the wire from the high-voltage battery.

13. An on-board device control method of controlling a relay control driver circuit for performing ON/OFF control of a relay that connects and shuts off a wire from a battery equipped in a vehicle, the method comprising:

when an abnormality occurs in the vehicle, performing a current drawing out process of drawing out a current from an output unit of the relay control driver circuit, to prevent the relay from being turned on when the abnormality occurs in the vehicle, wherein the switch circuit is connected to the output unit through a backflow prevention circuit, when the driver circuit is in operation, the backflow prevention circuit prevents a current caused by a counter-electromotive force from flowing to the switch circuit, the relay includes a first relay connected to one of poles of the battery and a second relay connected to another pole of the battery, the output unit includes a first output unit that controls the first relay and a second output unit that controls the second relay, and the switch circuit commonly controls the first output unit and the second output unit through different backflow prevention circuits from each other.

* * * * *